United States Patent [19]

Diemert

[11] 4,025,122

[45] May 24, 1977

[54] TRANSMISSION OF GRANULAR MATERIAL

[75] Inventor: Paul M. Diemert, Upland, Calif.

[73] Assignee: Reed Manufacturing Co., Inc., Walnut, Calif.

[22] Filed: Oct. 3, 1975

[21] Appl. No.: 619,366

[52] U.S. Cl. .............................. 302/49; 222/194; 222/197; 222/231; 302/56
[51] Int. Cl.[2] ......................................... B65G 53/46
[58] Field of Search ............... 302/49, 56; 222/194, 222/197, 231, 349, 350; 259/34, 43, 44

[56] References Cited

UNITED STATES PATENTS

| | | | |
|---|---|---|---|
| 1,768,826 | 7/1930 | Campbell | 222/231 |
| 1,965,741 | 7/1934 | Jameson | 222/197 |
| 2,111,875 | 3/1938 | Swanson | 222/231 |
| 2,123,318 | 7/1938 | Taylor | 222/231 |
| 2,262,094 | 11/1941 | Burt | 302/49 |
| 2,637,539 | 5/1953 | Crom | 302/49 |
| 2,685,388 | 8/1954 | Steiner | 222/231 |
| 2,687,239 | 8/1954 | Keenan | 222/231 |
| 3,161,442 | 12/1964 | Reed | 302/49 |
| 3,474,937 | 10/1959 | Frey | 222/231 |

FOREIGN PATENTS OR APPLICATIONS

| | | | |
|---|---|---|---|
| 1,278,303 | 12/1960 | France | 302/56 |

Primary Examiner—John J. Love
Assistant Examiner—Jeffrey V. Nase
Attorney, Agent, or Firm—Fulwider Patton Reiber Lee & Utecht

[57] ABSTRACT

Improved apparatus for the transportation of granular materials such as concrete is disclosed. The apparatus includes a pneumatic discharge area, a rotatable feed wheel having a plurality of pockets opening to a hopper for transporting increments of material to the discharge area and vibrating apparatus including one or more resilient members disposed adjacent the openings to the feed wheel pockets for being alternately flexed and released to impart vibration to the resilient members to enhance the flow of material into the pockets. The vibrating apparatus further includes a mounting ring, adapted for mounting in the device, and one or more inwardly extending mounting bars affixed to the ring for carrying the resilient members. In the preferred embodiment, the ends of the resilient members extend into the pockets when registered therewith and contact between the upper edge of the pockets and the corresponding resilient member during rotation of the feed wheel imparts the flexing action to the resilient member.

17 Claims, 9 Drawing Figures

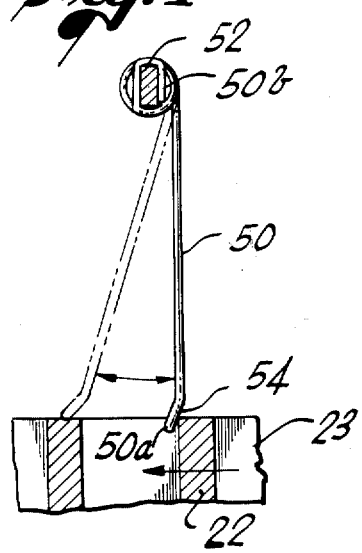
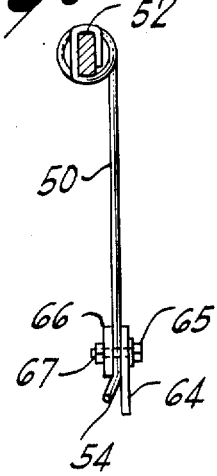
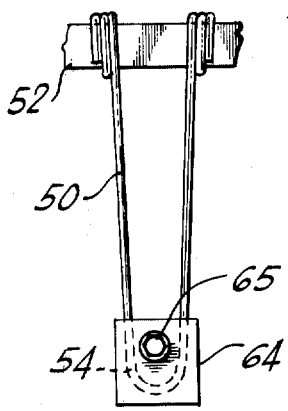
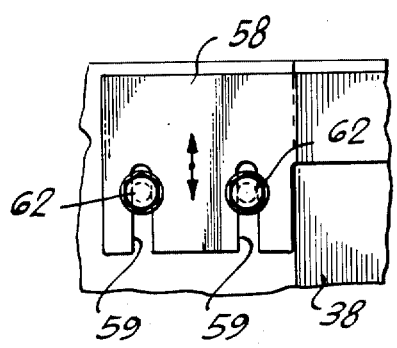
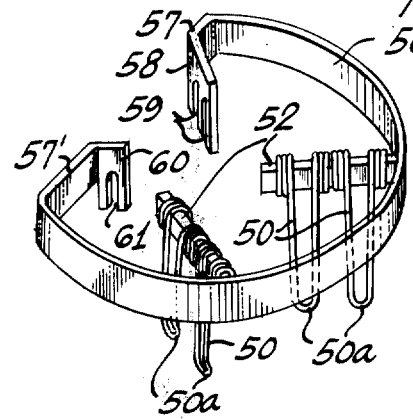
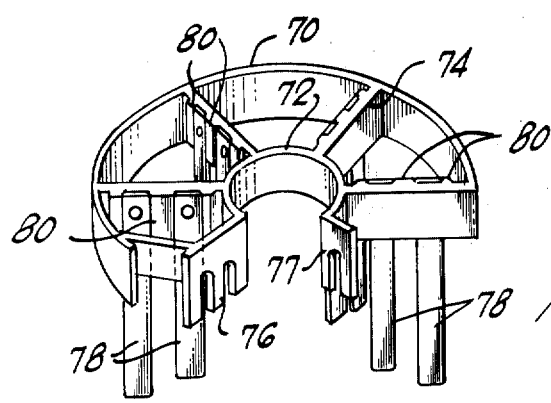

TRANSMISSION OF GRANULAR MATERIAL

BACKGROUND OF THE INVENTION

The present invention relates to the transportation of granular materials and more particularly to an improved method and apparatus for the pneumatic transportation of granular material in both dry and wet form.

The term "granular material" as used herein refers to particulate materials ranging in particle size from finely divided dust and powders to coarse gravels and includes mixtures of particulate materials such as for example refractory mixes, sand and cement mixes and the like. In construction work such materials are frequently pneumatically transported to a work site where an activating fluid, such as water in the case of sand and cement, is introduced to a stream of the granular material to form a cementitious construction material which is distributed, or "gunned" over a surface or into a suitable form and left to harden. In other cases, pneumatic means are employed for merely transporting the granular material from one point to another.

Mechanisms for effecting pneumatic transportation of granular materials are known in the art and generally comprise a hopper or storage area for the granular material, a pneumatic discharge area for entraining the granular material in an air stream and a feed mechanism for conveying granular material from the hopper to the pneumatic discharge area. A highly efficient device of the type to which the present invention generally relates is disclosed in U.S. Pat. No. 3,161,442. This device includes, in addition to the hopper and pneumatic discharge area, a rotatable feed rotor which is provided with a plurality of pockets for receiving increments of granular material from the hopper. The pockets are moved by rotation of the feed rotor into registration with an air discharge line in the pneumatic discharge area for the entrainment of the granular material in an air stream.

The prior art devices required granular materials having good flow characteristics in order to properly function and often the presence of even minor amounts of moisture is sufficient to cause stoppages or to otherwise produce a discontinuous, non-uniform stream. Such conditions are undesirable, particularly where the device is used for gunning concrete since variations in the discharge stream can adversely affect the ultimate properties of cement. In addition, it is preferred in some construction work and the like to premix the granular material and liquid, although for gunning operations using pneumatic transporters, premixing to form a wet mix having the most desirable ultimate properties is very difficult because of the poor flow characteristics of the mix.

Furthermore, unintentional additions of moisture such as exposure to the elements often result in blockages requiring shutdown and disassembly to clear the blockage.

The present invention overcomes the foregoing deficiencies of the prior art and provides for the pneumatic transportation of granular material having poor flow characteristics. Further the present invention permits the pneumatic transportation of premixed granular material and activator liquid in proportions which heretofore were considered as being non-transportable by pneumatic means.

SUMMARY OF THE INVENTION

The present invention resides in an improved transporting device for granular materials of the type including a feed mechanism comprising a rotatable feed wheel assembly having a plurality of annularly arranged pockets. Means are provided adjacent the feed wheel assembly for vibrating the granular material to increase its flowability. In accordance with the invention, mixtures of granular materials and liquid which exhibit extremely poor flow characteristics and which are conventionally considered non-transportable by devices of the type to which the present invention relates, are transported and discharged in a continuous, uniform stream.

More particularly, the invention includes at least one resilient member disposed adjacent the hopper outlet and the feed wheel assembly being radially located with respect to the feed wheel assembly for registration with the annularly arranged pockets. Responsive to the rotation of the feed wheel assembly, vibratory motion is induced in the resilient member which is translated to the granular material adjacent the resilient member facilitating its flow through the hopper opening and into the pockets of the feed wheel assembly.

The resilient member is arranged with its longitudinal axis parallel to the axis of rotation of the feed wheel assembly and is secured at its end most remote from the feed wheel assembly so that the resilient member is flexed and vibrated about an axis defined by its fixed end, which axis is perpendicular to the axis of rotation of the feed wheel assembly. The opposite free end of the resilient member terminates adjacent the feed wheel assembly in registration with the annularly arranged pockets.

In a preferred embodiment of the present invention, the feed wheel includes an inner and outer annular ring of openings which define pairs of radially spaced ports for each of the pockets. At least a pair of resilient members are preferably located in the device with one member of the pair aligned with the outer ring of opening and the other member aligned with the inner ring. The resilient members are vertically located with respect to the feed mechanism so that the lower end of the member extends a short distance into the pocket when the member and pocket are in vertical registration.

Other features of the present invention reside in adjustable means for mounting the resilient members within the transporting device and in means for protecting the lower extremities of the resilient member to increase the useful life thereof. These and other features and advantages of the present invention will be apparent from the following detailed description taken in conjunction with the drawings and the claims appended hereto.

BRIEF DESCRIPTION OF THE DRAWINGS

FIG. 4 is an enlarged side view, partially in section and partially broken away for compactness of illustration, showing a resilient member in registration with a pocket of the feed wheel assembly and in broken line, the resilient member in its flexed position;

FIG. 5 is a side elevation, partially in section illustrating a resilient member and means for protecting the end portion thereof;

FIG. 6 is a front elevation, partially broken away for compactness of illustration of the resilient member of FIG. 5;

FIG. 7 is a perspective view of the vibrator assembly;

FIG. 8 is an enlarged view of one end of the agitator assembly illustrating the mounting bracket vertically adjustably mounted in the device; and FIG. 9 is a perspective view of another embodiment of the vibrator assembly.

DESCRIPTION OF THE INVENTION

Figure 1:
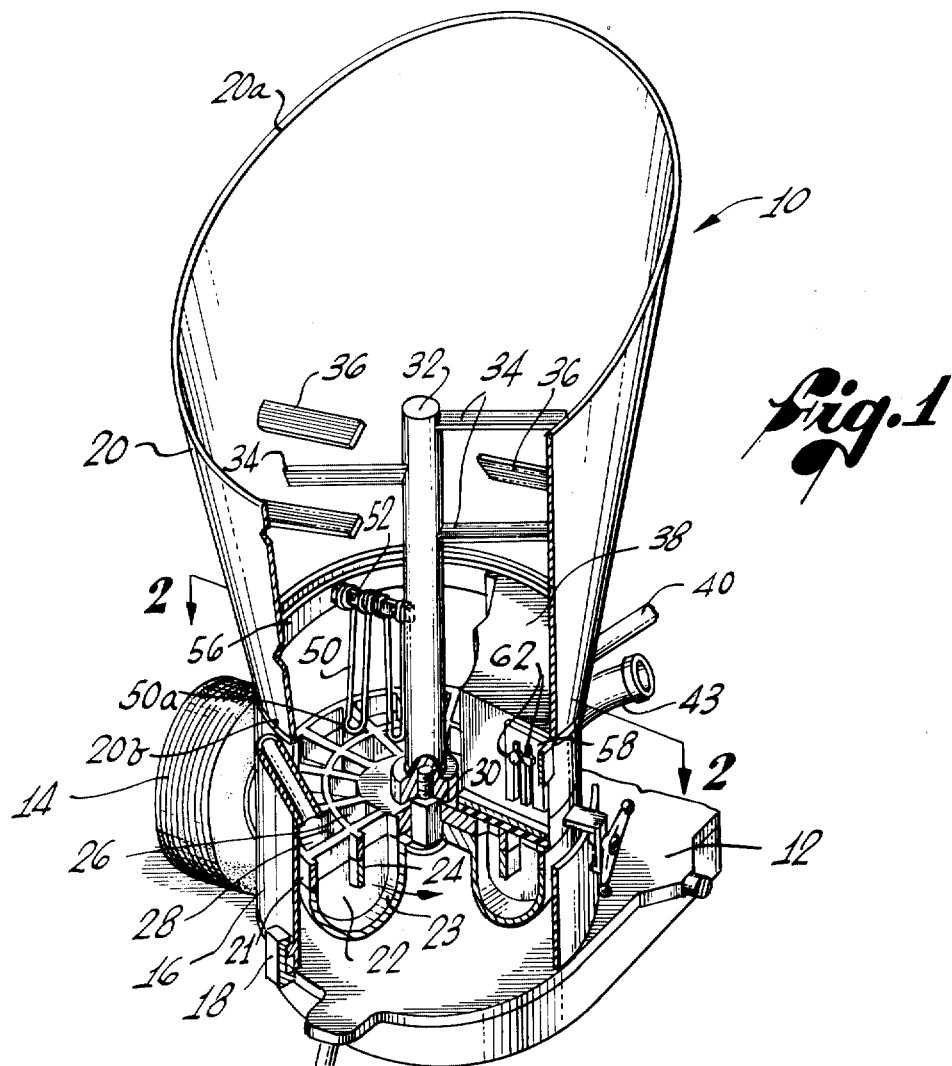
FIG. 1 is a perspective view, partially cut away and partially in section, illustrating a transport device for granular materials constructed in accordance with the present invention.

As illustrated in the drawings and particularly in FIG. 1, the transport device, illustrated generally as 10, includes a base plate 12 desirably provided with ground wheels 14 suitably mounted on the base plate. Carried on the upper surface of the base plate 12 is an open ended cylindrically shaped feed wheel assembly housing 16 which is removably secured to the base plate by a suitable clamp 18. A hopper 20 having an open upper end 20a and an open lower end 20b is carried on the upper edge of the feed assembly housing 16 for communication between the hopper and housing interior.

Mounted for rotation within the housing 16 is a feed wheel 21 having an annular, rounded bottom trough which is divided by radial partitions 22 into a plurality of annularly arranged pockets 23 for carrying granular material from the hopper 20 to a discharge area. The pockets 22 are transversely intersected by a cylindrical baffle 24 which extends downwardly and terminates in a plane spaced above the rounded bottom of the pockets. In this manner each of the pockets 23 defines in cross section a U-shaped chamber which communicates to the hopper 20 by an inner port 26 and an outer port 28.

The feed wheel 21 is mounted on and keyed to a vertical drive shaft 30 which extends upwardly through the base plate 12 from a vertical drive motor, not shown, mounted on the under surface of the base plate. A vertical post 32 is keyed at its lower end to the drive shaft 30 and extends upwardly into the hopper 20. A plurality of radially extending arms 34 are disposed along the post 32 in the hopper area and cooperate with inwardly extending stationary blades 36 carried by the wall of the hopper 20 to mix the granular material as the feed wheel 21 is rotated. For wet mixes of concrete, a different form of agitating paddles may be used depending upon the characteristics of the mix.

A discharge area is defined within the feed wheel assembly housing assembly 16 by a compartment 38 which is generally wedge shaped in plan configuration and which overlies a segment of the feed wheel 21 of about 45°. An air inlet line 40 passes into the compartment 38 and terminates at an orifice 41 provided in the bottom wall thereof, which is radially aligned with the ring of inner ports 26. A second orifice 42 is radially aligned with the ring of outer ports 28 and communicates with a discharge line 43.

In operation, granular material flows from the hopper 20 into the pockets 23 of the feed wheel 21. Rotation of the feed wheel 21 transports the granular material into the discharge compartment 38 where the inner ports 26 and outer ports 28 are sequentially brought into registration with the orifices 41 and 42 respectively. Air passes through the inner port 26 and entrains the material in the pocket 21 in the air stream where it is carried through the outer port 28 to the discharge line 43.

Under certain conditions, the flow characteristics of the granular material are such that one or more of the pockets 23 are incompletely filled or, in an extreme case, may be completely blocked, which results in a nonuniform non-continuous discharge stream of granular material. This may occur when the amount of liquid present in the granular material causes it to form a poorly flowable mass in the hopper 20 or to cause lumping of the granular material resulting in blockage of the ports 26 and 28. If the action of the arms 34 and the blades 36 is insufficient to correct the problem, the normal solution is to shut down operation of the device and clean the hopper and feed wheel.

In accordance with the present invention, means are provided for enhancing the flowability of the granular material adjacent the feed wheel 23. Thus, even poorly flowable materials, such as, for example, wet mix low slump concretes are caused to flow and fill the pockets 23 so that uniform increments of material are delivered to the discharge area and the discharge stream is smooth and continuous.

Figure 2:
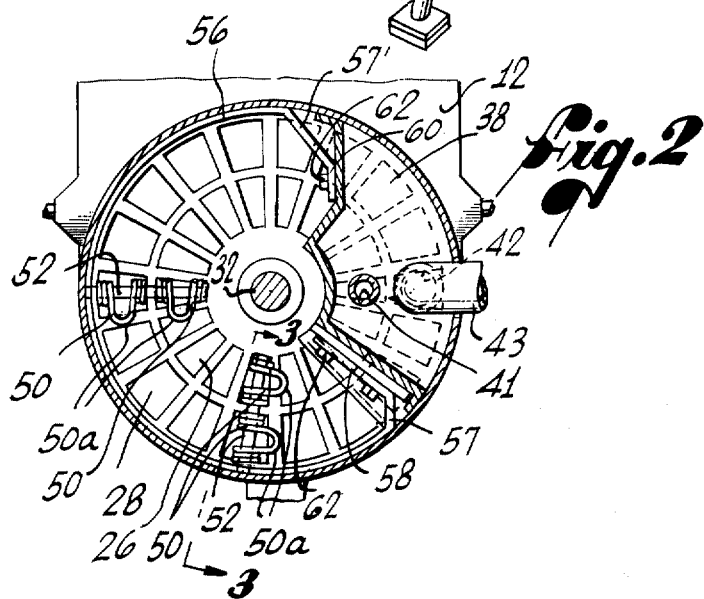
FIG. 2 is a top sectional view taken through line 2—2 of FIG. 1.
Figure 3:
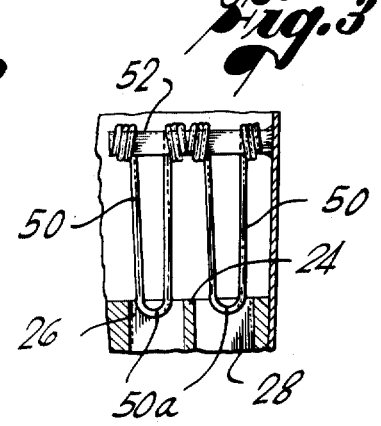
FIG. 3 is an enlarged side elevation, partially in section, taken through line 3—3 of FIG. 2, illustrating a pair of resilient members in registration with the pocket of the feed wheel assembly.

As shown in FIGS. 1–3, the preferred embodiment of the invention includes at least one pair of elongated spring members or fingers 50 which are removably secured at their upper ends to an inwardly extending mounting bar 52 secured at one end to the outer hopper 20 or housing 16 wall adjacent the lower opening 20b of the hopper. The fingers 50 are vertically oriented for extension into the housing 16 and are radially spaced with respect to the feed wheel 23 so that one finger of a pair is aligned with the ring of inner ports 26 and the other finger with the ring of outer ports 28. The lower free end 50a of each of the fingers 50 extends a short distance into the respective ports 26 and 28 when the ports and fingers are in registration.

Each of the spring fingers 50 is preferably formed as an elongate spring wire loop with the upper ends of each arm of the loop formed as a coil having sufficient internal diameter to receive the mounting bar 52. The end portion 50b of the finger 50 is formed against the face of the mounting bar 52 to prevent rotation of the finger 50 about the mounting bar. The free end 50a is biased (FIG. 4) in the direction of rotation of the feed wheel 23 to define an inclined contact surface 54 for engagement with the upper edge portion of the feed wheel pockets adjacent a port 26 or a port 28 during the wheel's rotation to impart a flexing action to the spring fingers.

The spring fingers 50 and mountng bar 52 are preferably formed as a separate assembly for ease of replacement and for insertion in conventional transport devices already in the field. As is shown in FIG. 7, two of the inwardly extending mounting bars 52, each carrying a pair of spring fingers 50, are rigidly attached at their outer ends to a mounting ring 56. The inner ends of the mounting bars 52 are freely extending for slidably receiving or removing the spring fingers 50. A segment of the mounting ring 56 corresponding to the compartment 38 is open and the end portions 57 and 57' are radially inwardly directed and spaced apart for receiving the sides of the wedge shaped compartment. One end portion 57 is formed as a flat plate 58 which is provided with a pair of spaced apart slots 59. The other end portion 57' has formed thereon a plate 60 having a single slot 61. The assembly is mounted with the end portions 57 and 57' and the plates 58 and 60 being contiguous with conforming portions of the wall of the compartment 38. The plates 57 and 57' are adjustably secured on the respective wall portions of the compartment 38 by bolts 62 which extend through the slots 59 and 61 for threadable engagement in the wall of the compartment. In this manner, the assembly is adjustably secured so as to permit the raising and lowering of the fingers 50 with respect to the feed wheel 21.

During operation, the rotation of the feed wheel 21 flexes the fingers 50 by engagement between the trailing upper edge of a port 26 or 28 and the contact surface 54 of the finger. The lower end 50a is moved with the feed wheel 21 flexing the finger 50 and simultaneously causing the lower end 50a to move upwardly out of the port. The flexing action is resisted by the spring finger 50 and when the lower end 50a has cleared the port 26 or 28, the finger springs back to its normal position with the lower end 50a moving into the next adjacent port. The flexing and springing action produces a vibratory movement in the finger 50 which agitates the surrounding granular material both above and within the pocket 23 resulting in improved flow of material and also reduces lumps of the granular material which could block the ports 26 and 28.

Advantageously, the finger 50 aligned with the ring of inner ports 26 will be flexed prior to the finger aligned with the ring of outer ports 28 so that in combination, the vibratory action of the fingers is substantially continuous. Thus, while one of a pair of fingers 50 is being flexed, the other is springing back into the next pocket and exerting the vibratory action.

The action of the spring fingers 50 in the pockets 23 is further enhanced by disposing the mounting bar 52 so that it extends inwardly at an angle to the radius of the feed wheel 21. In this manner, the lower end 50a sweeps through a greater portion of the interior of the pocket 23 than is the case when the bars 52 extend inwardly parallel to the radius of the feed wheel 21.

It will be apparent that the free end 50a of the finger 50 is subjected to substantial wear, particularly at the contact surface 54. The useful life of the fingers 50 is increased by providing a flexible protective member adapted to protect the contact surface 54.

As shown in FIGS. 5 and 6, a flexible protective member 64 is secured on the finger 50 by conventional means, such as a bolt 65, clamping plate 66 and a nut 67, which are drawn together to clamp the member on the finger in overlying relationship with the contact surface 54. Thus, the protective member 64 also serves as a paddle to enhance the vibratory effect of the wire fingers 50. The protective member is formed from any wear resistant material such as for example nylon, "Teflon", elastomeric materials such as the silicones, polyvinylchloride, polyvinylacetate and the like and rubbers both natural and synthetic. Good results have been achieved using metal wire reinforced rubber.

Although the invention has been described in connection with wire spring resilient members, other forms of resilient members are also effective. As shown in FIG. 9, a mounting fixture may be used which includes an outer ring 70 and an inner ring 72 interconnected by radial bars 74. The rings 70 and 72 are opened for receiving the compartment 38 and the slotted open ends of the inner ring are directed radially outwardly so as to define mounting plates 76 and 77 for adjustable mounting on the side walls of the compartment 38 in the manner previously described. Each of the radial bars 74 carries a pair of vertically aligned flexible blades 78 which are radially spaced along a face of the radial bar for alignment of the blades with the ring of inner ports 26 and outer ports 28. As an aid to the securing and aligning of the blades 78, the faces of each bar 74 to which the blades are secured are provided with bosses 80 which define recesses between them for receiving the upper end portion of the blade. The function and operation of the blades 78 is the same as has already been described in connection with the spring fingers 50.

While in its preferred form the invention has been described in connection with paired resilient members, useful vibratory action is achieved utilizing a single resilient member radially spaced in the device for alignment with either the ring of inner ports 26 or outer ports 28. Likewise, the number of resilient members employed may range from as few as one resilient member to as many as eight or more. In the preferred embodiment, four resilient members arranged as two pairs are employed in devices to transport poorly flowable materials such as one-quarter and one-half inch slump concrete.

In addition, operation of the device of the present invention is not dependent on the extension of the ends of the resilient members into the pockets of the feed wheel. Thus, the ends can be adjacently spaced above the ports and in such a case, additional means are utilized to impart the desired flexing action to the resilient members. For example, portions of the feed wheel adjacent the edges of the ports can be raised to contact the ends of the resilient members as the wheel is rotated or one or more radially inwardly extending striker arms can be disposed in the device for rotation with the feed wheel to strike the resilient members and impart the vibratory action thereto.

Although the invention has been described in connection with several specific embodiments, it will be clear that modifications and changes can be made without departing from the spirit and scope of the invention as defined by the appended claims.

I claim:

1. For use in a device for transporting granular material, said device including a rotatable feed wheel with a plurality of upwardly opening, annularly arranged pockets communicating with a hopper, apparatus for vibrating said granular material thereby to enhance the free flow thereof into the pockets of the feed wheel, said apparatus comprising:
   a mounting ring adapted to be disposed within said device;
   an inwardly extending mounting bar affixed at one end to said mounting ring; and
   at least one elongated resilient member affixed at its upper end to said mounting bar and depending therefrom, said resilient member being located on said mounting bar for radial alignment of its lower end with said openings of said pockets.

2. The apparatus of claim 1 wherein a major portion of said mounting ring is circular, said mounting ring being broken to define two end portions thereof, said end portions being oppositely inwardly directed to define a generally wedge shaped segment therebetween adapted to conform with side walls of a wedge shaped compartment in said transport device.

3. The apparatus of claim 2 wherein said end portions define mounting plates, each of said plates having at least one downwardly opening elongated slot for vertically adjustably securing said mounting ring on said compartment side walls.

4. The apparatus of claim 1 wherein said resilient member is an elongated spring wire loop, an upper end of which is formed as a coil for receiving said mounting bar.

5. The apparatus of claim 1 wherein said resilient member is a flat spring with its upper end mounted to said mounting bar.

6. The apparatus of claim 1 further including an inner ring and a plurality of radial mounting bars interconnecting said mounting ring and said inner ring.

7. The apparatus of claim 6 wherein said corresponding portions of mounting ring and said inner ring are broken away to define an open wedge shaped segment, the ends of said inner ring carrying outwardly extending mounting plates adapted for mounting on the side walls of a compartment within said device, each of said mounting plates being provided with at least one downwardly opening slot.

8. A device for transporting granular materials comprising:
 a hopper including an open lower end;
 a horizontally disposed rotatable feed wheel including a plurality of annularly arranged upwardly opening pockets underlying the lower end of said hopper and communicating therewith for receiving increments of a granular material therefrom;
 a discharge area including a discharge line and pneumatic means for expelling granular material from said pockets into said discharge line;
 a plurality of resilient members in the form of elongated spring wire loops with their longitudinal axes parallel to the axis of rotation of said feed wheel and radially spaced therefrom in alignment with the openings of said pockets, each wire loop having at least one end formed as a coil for mounting on a bar and a loop end inclined from the longitudinal axis of said members in the direction of rotation of said feed wheel to define an inclined contact surface for engagement with said feed wheel; and
 drive means for rotating said feed wheel and thereby imparting vibratory motion to said resilient members.

9. The device of claim 8 further including mounting means for carrying said members, said means being adapted to vertically adjust said resilient members with respect to said feed wheel.

10. The device of claim 8 further including a wear resistant member carried by the loop of each said resilient member for protecting said contact surface when engaged with said feed wheel.

11. A transmission device for granular material comprising:
 a hopper including open upper and lower ends;
 a feed assembly including a rotatable feed wheel havng a plurality of annularly arranged pockets with a ring of inner ports and a ring of outer ports defining pairs of radially spaced ports corresponding with each of said pockets for communication therewith;
 a pneumatic discharge area including an air inlet and a discharge line for sequentially registering with said inner ports and outer ports respectively for discharge of material contained in said pockets;
 means for vibrating granular material adjacent said ports including at least one pair of elongated resilient members adjacent the upper face of said feed wheel, the longitudinal axes of said members being parallel to the axis of rotation of said feed wheel and being radially spaced therefrom so that one member is aligned with said ring of outer ports and said other member is aligned with said ring of inner ports, said members being adapted to be alternately flexed and released responsive to the rotation of said feed wheel thereby to cause said resilient members to vibrate;
 a mounting ring and at least one inwardly extending mounting bar to which said resilient members are secured, said bar being affixed at one end thereof to said ring, said ring being adapted to be received in said device adjacent said lower end of said hopper and being vertically adjustably secured to a portion of a wall of said device for raising and lowering said resilient members relative to said wheel; and
 drive means for rotating said feed wheel.

12. The device of claim 11 wherein the loop end of said member is inclined from the longitudinal axis of said member in the direction of rotation of said feed wheel to define an inclined contact surface for engagement with said feed wheel.

13. The device of claim 12 further including a flexible wear resistant member carried by said resilient member for providing a wear resistant protective surface between said feed wheel and said contact surface of said resilient member when they are engaged.

14. The device of claim 11 wherein each of said resilient members includes a free end disposed in relation to said feed wheel for extension into one of said ports when registered therewith.

15. A transmission device for granular material comprising:
 a hopper including open upper and lower ends;
 a feed assembly including a rotatable feed wheel having a plurality of annularly arranged pockets with a ring of inner ports and a ring of outer ports defining pairs of radially spaced ports corresponding with each of said pockets for communication therewith;
 a pneumatic discharge area including an air inlet and a discharge line for sequentially registering with said inner ports and outer ports respectively for discharge of material contained in said pockets;
 means for vibrating granular material adjacent said ports including at least one pair of elongated resilient members adjacent the upper face of said feed wheel, each resilient member being an elongated spring wire loop, the longitudinal axes of which is parallel to the axis of rotation of said feed wheel and being radially spaced therefrom, at least one said resilient member being aligned with said ring of outer ports, and said other resilient member being aligned with said ring of inner ports, said resilient members being adapted to be alternately flexed and released responsive to the rotation of said feed wheel thereby to cause said resilient members to vibrate;
 mounting means for supporting said resilient members including a mounting bar disposed above said feed wheel to which the ends of said resilient members are secured; and
 drive means for rotating said feed wheel.

16. A transmission device for granular material comprising:
- a hopper including open upper and lower ends;
- a feed assembly including a rotatable feed wheel having a plurality of annularly arranged pockets with a ring of inner ports and a ring of outer ports defining pairs of radially spaced ports corresponding with each of said pockets for communication therewith;
- a pneumatic discharge area including an air inlet and a discharge line for sequentially registering with said inner ports and outer ports respectively for discharge of material contained in said pockets;
- means located within said hopper for vibrating granular material adjacent said ports including at least one pair of elongated, vertically aligned, radially spaced, resilient members adjacent the upper face of said feed wheel, the longitudinal axes of said members being parallel to the axis of rotation of said feed wheel and being radially spaced therefrom so that one member is aligned with said ring of outer ports, and said other member is aligned with said ring of inner ports, said members being adapted to be alternately flexed and released responsive to the rotation of said feed wheel thereby to cause said resilient members to vibrate;
- mounting means for supporting said resilient members in a vertically adjustable position above said feed wheel, said mounting means including a mounting bar to which at least one of said resilient members is secured; and
- drive means for rotating said feed wheel.

17. A transmission device for granular material comprising:
- a hopper including open upper and lower ends;
- a feed assembly including a rotatable feed wheel having a plurality of annularly arranged pockets with a ring of inner ports and a ring of outer ports defining pairs of radially spaced ports corresponding with each of said pockets for communication therewith;
- a pneumatic discharge area including an air inlet and a discharge line for sequentially registering with said inner ports and outer ports respectively for discharge of material contained in said pockets;
- means located within said hopper for vibrating granular material adjacent said ports including at least a pair of elongated, vertically aligned, radially spaced, resilient blades adjacent the upper face of said feed wheel, the longitudinal axes of said blades being substantially parallel to the axis of rotation of said feed wheel and being radially spaced therefrom so that one blade is aligned with said ring of outer ports, and said other blade is aligned with said ring of inner ports, said blades being in registration with the openings of said pockets, and adapted to be alternately flexed and released responsive to the rotation of said feed wheel thereby to cause said resilient blades to vibrate;
- mounting means for supporting said blades including a mounting bar disposed above said feed wheel to which the ends of said resilient members are secured; and
- drive means to rotate said feed wheel.

* * * * *